United States Patent
Shihoh

[11] Patent Number: 5,850,376
[45] Date of Patent: Dec. 15, 1998

[54] CARTRIDGE AUTO-CHANGER HAVING A PUSH LEVER AND A FEED ROLLER

[75] Inventor: Makoto Shihoh, Yokohama, Japan

[73] Assignee: Canon Kabushiki Kaisha, Tokyo, Japan

[21] Appl. No.: 528,420

[22] Filed: Sep. 14, 1995

[30] Foreign Application Priority Data

| Sep. 19, 1994 | [JP] | Japan | 6-223162 |
| Oct. 18, 1994 | [JP] | Japan | 6-252181 |
| Oct. 18, 1994 | [JP] | Japan | 6-252183 |
| Oct. 31, 1994 | [JP] | Japan | 6-267071 |
| Oct. 31, 1994 | [JP] | Japan | 6-267072 |
| Nov. 24, 1994 | [JP] | Japan | 6-289913 |

[51] Int. Cl.$^6$ .......................... G11B 17/22; G11B 17/04
[52] U.S. Cl. ............................................ 369/34; 369/178
[58] Field of Search ................................. 369/34, 38, 178; 360/92, 98.04, 98.05

[56] References Cited

U.S. PATENT DOCUMENTS

| 5,089,920 | 2/1992 | Bryer et al. | 360/92 |
| 5,157,564 | 10/1992 | Theobald et al. | 360/92 |
| 5,371,640 | 12/1994 | Kvifte et al. | 360/92 |

*Primary Examiner*—Stuart S. Levy
*Assistant Examiner*—David D. Davis
*Attorney, Agent, or Firm*—Fitzpatrick, Cella, Harper & Scinto

[57] ABSTRACT

A cartridge auto-changer is provided containing a plurality of cartridges therein and adapted to take out any one of the cartridges to thereby effect the recording and/or reproduction of information. The cartridge auto changer includes an information recording-reproducing apparatus for effecting recording and/or reproduction of information on recording mediums contained in the cartridges, a containing shelf for containing the plurality of cartridges therein, and a conveying device for conveying the cartridges between the information recording-reproducing apparatus and the containing shelf. The conveying device includes a feed roller for conveying the cartridges from the conveying device to the information recording-reproducing apparatus, and a push lever for pushing the cartridges into the information recording-reproducing apparatus subsequently to the conveyance of the cartridges by the feed roller.

4 Claims, 14 Drawing Sheets

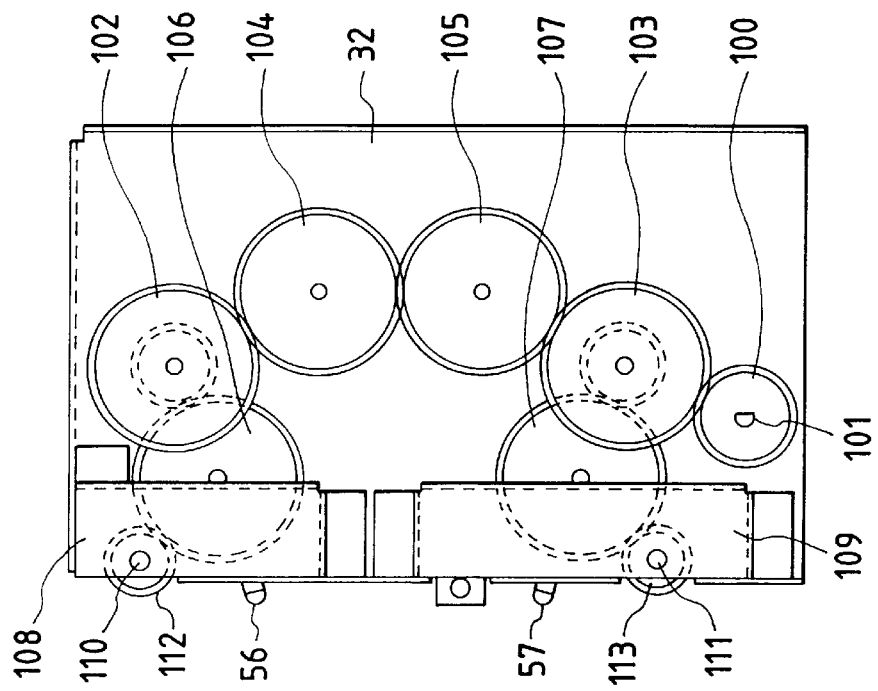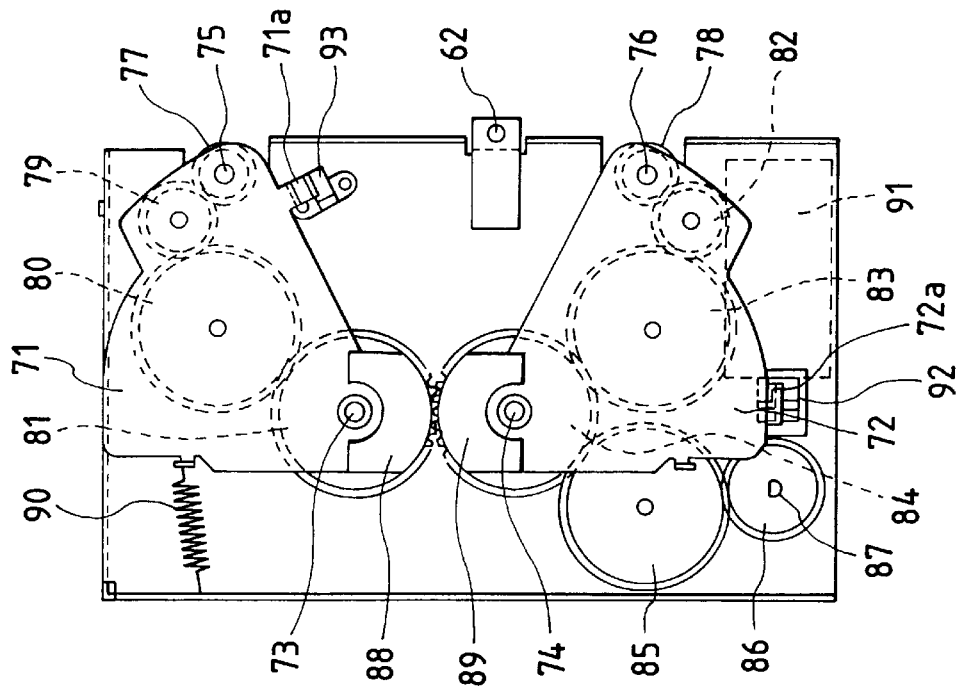

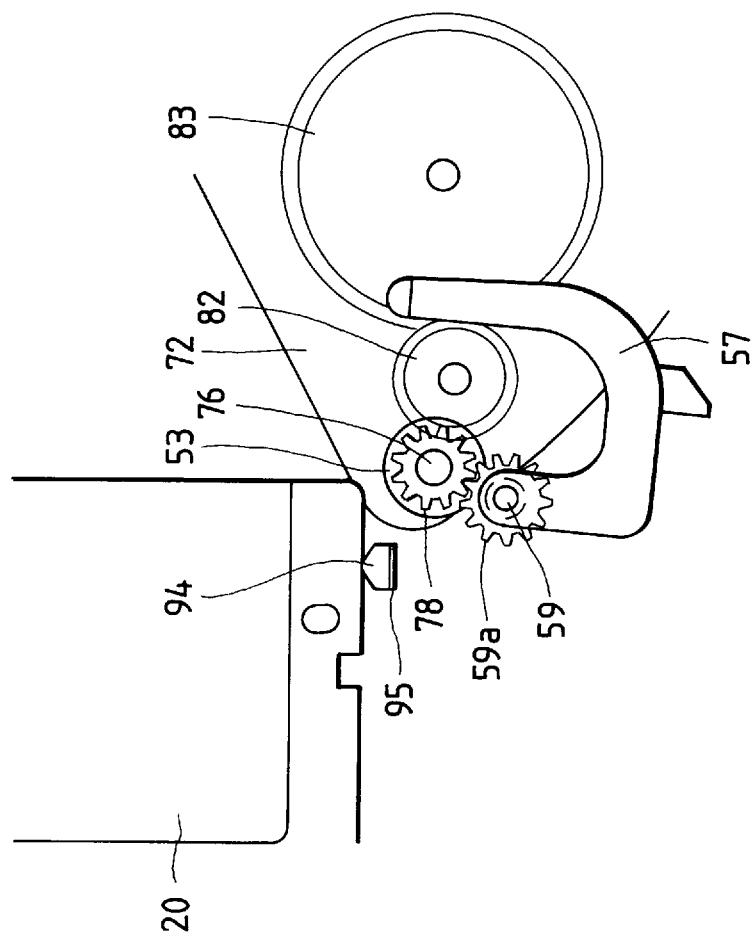
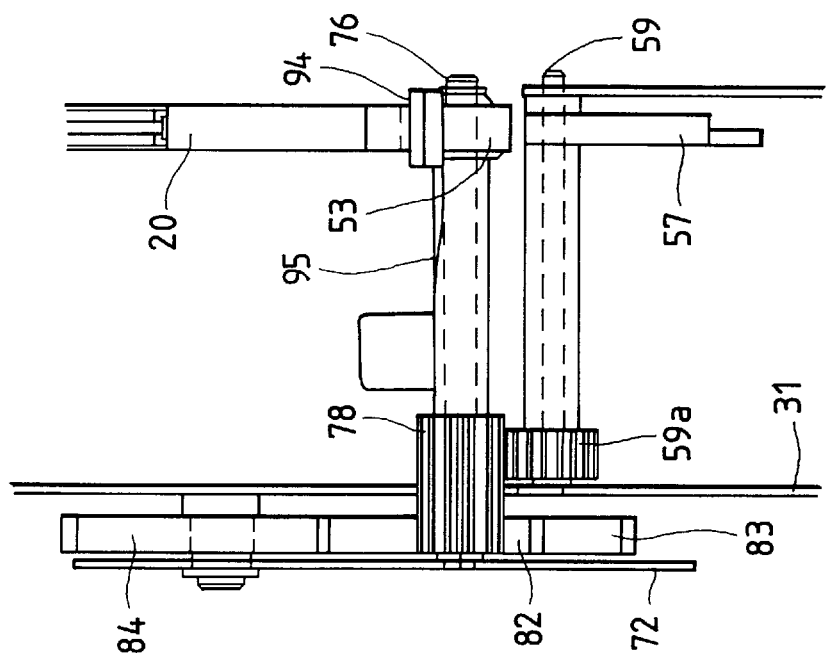

CARTRIDGE AUTO-CHANGER HAVING A PUSH LEVER AND A FEED ROLLER

BACKGROUND OF THE INVENTION

1. Field of the Invention

This invention relates chiefly to a cartridge auto-changer in which a plurality of cartridges containing recording mediums such as magneto-optical discs therein are contained in a magazine and a desired one of the cartridges contained in the magazine is taken out and inserted into a recording medium recording and/or reproducing apparatus for reproduction.

2. Related Background Art

Cartridge auto-changers have heretofore included one as shown, for example, in FIG. 1 of the accompanying drawings which is used for the reproduction of a disc-like recording medium (in this example, an optical disc). In this example, a recording medium reproducing apparatus 202 is provided in an auto-changer 201 and a fixed type magazine (not shown) is disposed in the upper portion thereof and a plurality of disc cartridges 203 each containing the recording medium therein are contained in the magazine while being arranged in parallelism to one another in the direction of thickness of the recording mediums.

Reference numeral 204 designates conveying means for conveying the individual cartridges 203 between the recording medium reproducing apparatus 202 and the magazine. The conveying means 204 can be moved in a vertical direction (the directions of the arrow in FIG. 1) by suitable driving means. That is, when for example, it is desired to reproduce information of the recording medium in the sixth cartridge from the bottom, the conveying means 204 is moved to a position corresponding to the sixth cartridge from the bottom, as shown, and a required cartridge in the magazine is carried onto the conveying means by cartridge mounting-dismounting means (not shown).

The conveying means 204 with the cartridge placed thereon is then moved downward and is stopped at a position corresponding to the cartridge loading port of the recording medium reproducing apparatus 202. Thereafter, the cartridge is inserted from the conveying means 204 into the recording medium reproducing apparatus 202, and information of the optical disc is reproduced. When information of another disc is to be reproduced, the previous cartridge is returned from the recording medium reproducing apparatus 202 onto the conveying means, which in turn is moved in the opposite course and returned to its original position in the magazine,, and then enters a similar conveying operation for a newly selected cartridge.

In the cartridge auto-changer of such a construction, when the cartridges 203 in the magazine are to be added, a required cartridge is placed onto the conveying means 204 through the loading port 205 of the auto-changer 201, and then the conveying means 204 is moved to a position corresponding the cartridge vacant area of the magazine and the cartridge is inserted into the magazine by the cartridge mounting-dismounting means.

When a required cartridge in the magazine is to be interchanged, an unnecessary cartridge is taken out onto the conveying means 204 by the cartridge mounting-dismounting means and the conveying means 204 is moved to the loading port 205, and the unnecessary cartridge is discharged out of the loading port 205. Thereafter, as previously described, a new cartridge can be inserted into the auto-changer.

Now, when a cartridge 203 is inserted halfway by the conveying means 204 through the loading port 205, the recording medium reproducing apparatus 202 has drawn the cartridge from that position to the loading position by a means on the recording medium reproducing apparatus side. Recently, however, in order to simplify (decrease the cost of) the mechanism, there are recording medium reproducing apparatuses in which loading cannot be done to the loading position unless a cartridge 203 is inserted into the loading port 205 side. However, in the above-described auto-changer according to the prior art, the conveying means 204 inserts the cartridge 203 only to halfway relative to the recording medium reproducing apparatus 202 and therefore, it has been impossible to use a recording medium reproducing apparatus incapable of automatic drawing-in, in lieu of the recording medium reproducing apparatus 202.

SUMMARY OF THE INVENTION

It is the object of the present invention to provide a cartridge auto-changer which is also applicable to a recording medium recording and/or reproducing apparatus incapable of automatic drawing-in.

Such an object is achieved by a cartridge auto-changer containing a plurality of cartridges therein and adapted to take out any one of the cartridges to thereby effect recording and/or reproduction of information, the cartridge auto-changer being provided with:

an information recording-reproducing apparatus for effecting the recording and/or reproduction of information on recording mediums contained in the cartridges;

a containing shelf for containing the plurality of cartridges therein; and conveying means for conveying the cartridges between the information recording-reproducing apparatus and the containing shelf, the conveying means being provided with:

a feed roller for conveying the cartridges from the conveying means to the information recording-reproducing apparatus; and a push lever for pushing the cartridges into the information recording-reproducing apparatus subsequently to the conveyance of the cartridges by the feed roller.

The invention will hereinafter be described in detail with respect to some embodiments thereof shown in the accompanying drawings.

BRIEF DESCRIPTION OF THE DRAWINGS

FIG. 8 is a side view showing a feed roller driving system.

FIG. 9 is a side view showing a driving system for push levers.

FIG. 19 is a front view of the construction shown in FIG. 18.

FIG. 20 is a side view showing the state of the operating process by feed rollers.

DESCRIPTION OF THE PREFERRED EMBODIMENTS

[First Embodiment]

Figure 2:
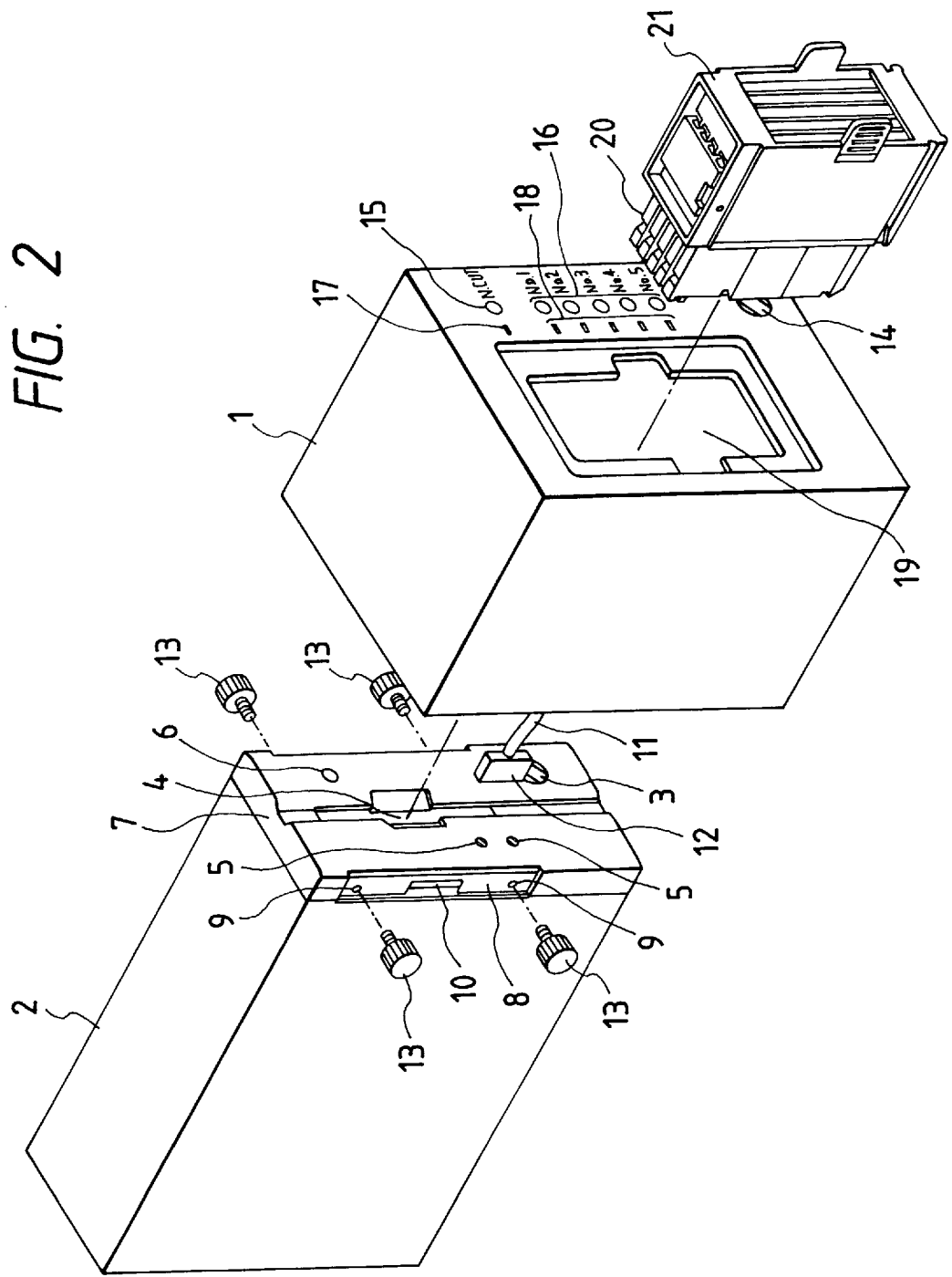
FIG. 2 is a schematic perspective view showing a first embodiment of the present invention.
Figure 4:
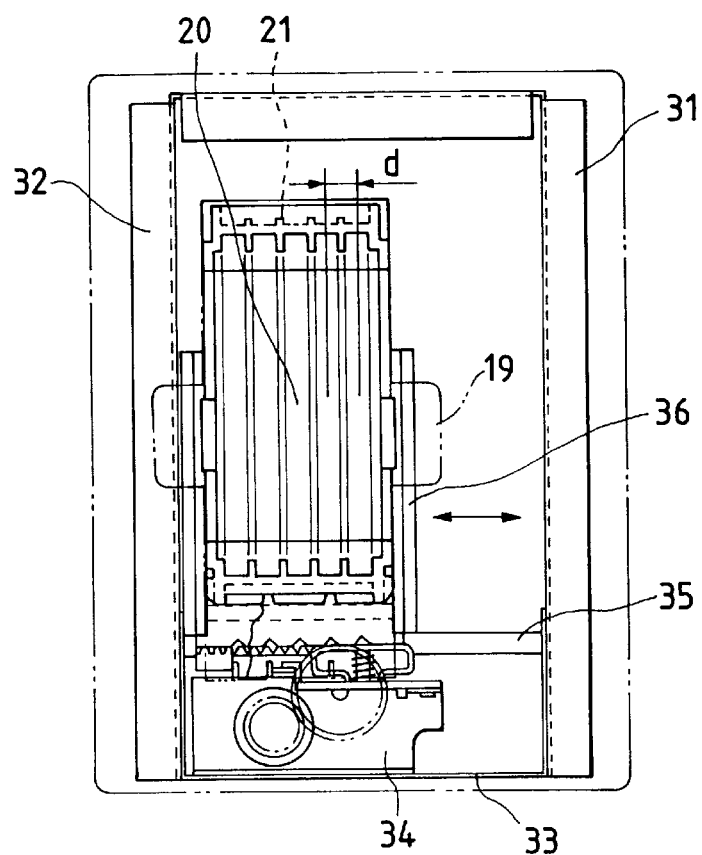
FIG. 4 is an opened-up front view of the auto-changer unit.
Figure 5:
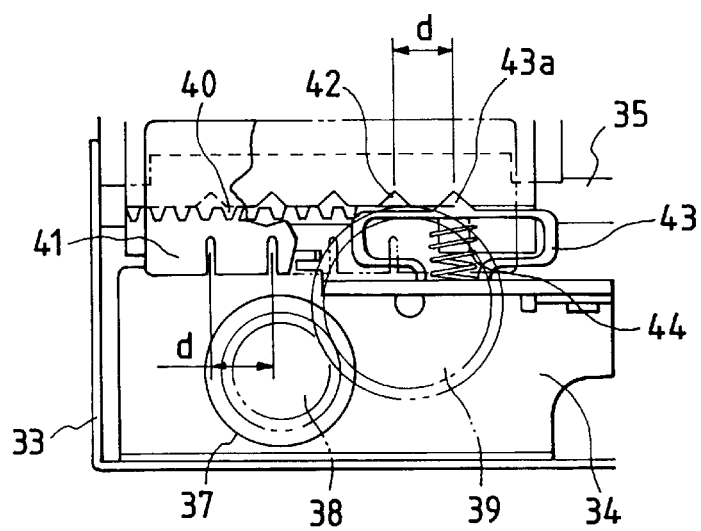
FIG. 5 is a fragmentary enlarged view of the auto-changer unit.

A first embodiment of the present invention will hereinafter be described in detail with reference to FIGS. 2 to 11. In FIG. 2, there is shown a cartridge auto-changer designed such that a plurality of cartridges 20 containing therein optical discs as disc-shaped recording mediums are contained in a magazine 21 and a desired cartridge is taken out of the magazine and inserted into a recording medium reproducing apparatus 2 by loading means (which will be described later), and particularly in this embodiment, the recording medium reproducing apparatus 2 is externally attached to an auto-changer unit 1 and may preferably be, for example, a single disc drive provided in advance in a personal computer or the like.

The recording medium reproducing apparatus 2 in this embodiment, as is usual, is provided with a power source switch 3, a cartridge loading port 4, a display LED 5, an eject switch 6, etc. on the front panel 7 thereof. Also, two places (not shown) on the right and left side portions of the front panel 7 are removable, and when these side portions are removed, an internal chassis 8 becomes exposed. The internal chassis 8 is formed with four threaded holes 9 and a cut-away 10 as means for mechanically connecting the auto-changer unit 1, and four mounting screws 13 are removably threadably engaged with these threaded holes 9. Also, as electrical communication means for enabling the supply of electric power from a power source in the recording medium reproducing apparatus 2 to the auto-changer unit 1 and the exchange of a signal between the recording medium reproducing apparatus 2 and the auto-changer unit 1, a cable 11 is led out to the rear of the auto-changer unit 1, and a connector 12 is provided on the tip end of the cable 11. Also, the connector 12 is connected to an internal connector (not shown) through the cut-away 10 formed in the internal chassis 8 of the recording medium reproducing apparatus 2.

Figure 1:
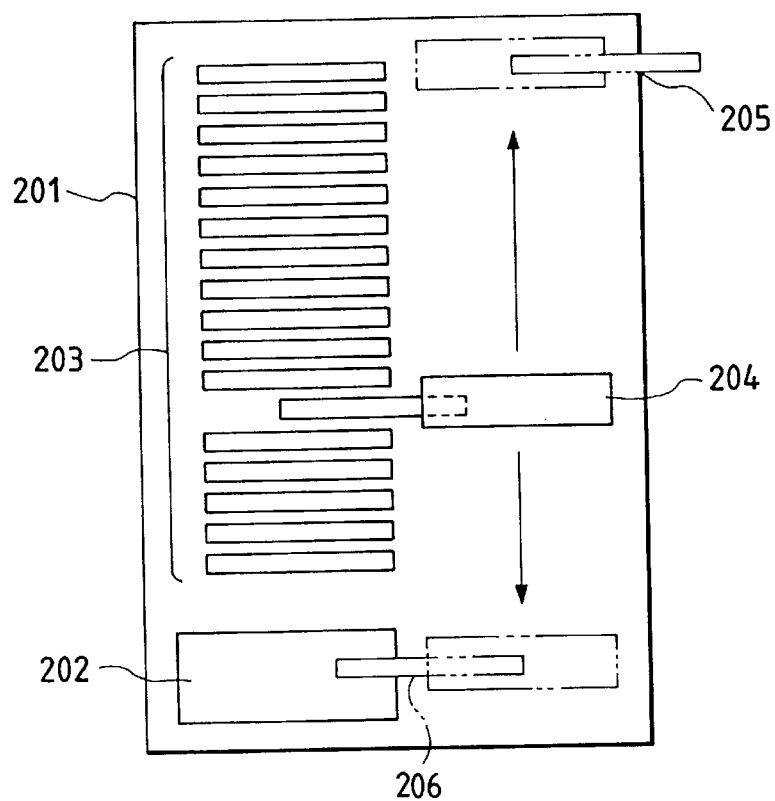
FIG. 1 is a plan view conceptually showing an example of the prior art.
Figure 3:
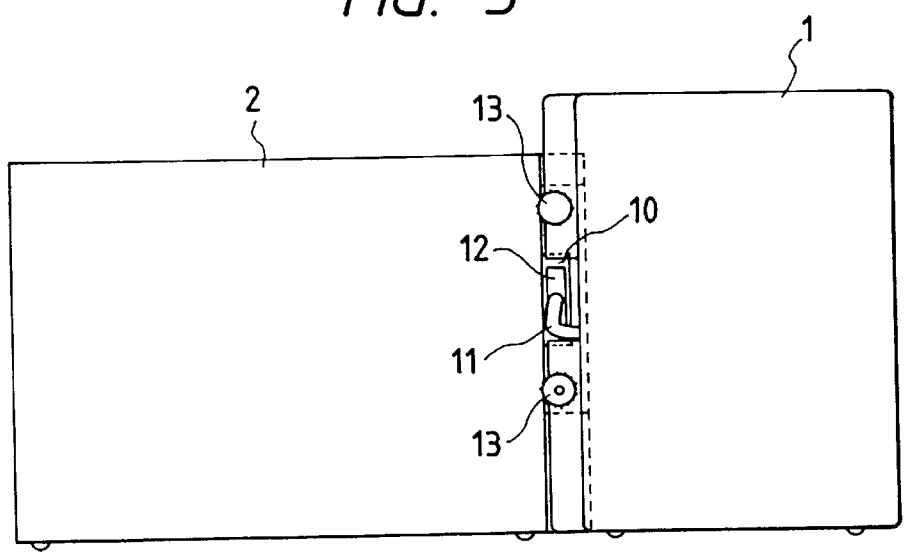
FIG. 3 is a side view showing the connected state of an auto-changer unit according to the first embodiment.

Such mechanical connection and electrical transmission are accomplished in the following manner. The rear end portion of the auto-changer unit 1 is inserted into the front portion of the recording medium reproducing apparatus 2, and the connector 12 is connected to the recording medium reproducing apparatus side. It is then set by the mounting screws 13, whereby the two are connected together. FIG. 3 shows the state after the recording medium reproducing apparatus 2 and the auto-changer unit 1 have been coupled together.

The magazine 21 contains therein the cartridges 20 arranged in the form of a straight line at a pitch d (see FIGS. 4 and 5) in the direction of thickness of the recording mediums, and is designed to be removably inserted into the auto-changer unit through a magazine loading port 19 provided in the front face of the auto-changer unit 1. The auto-changer unit 1 is of a construction in which a chassis is incorporated in the casing thereof. The chassis is comprised of a right chassis 31, a left chassis 32 and a lower chassis 33, and a motor bed 34 equipped with a feed motor 37 is provided on the lower chassis 33 (see FIGS. 4 to 6).

A guide rail 35 supported by the lower chassis 33 and horizontally extending in parallelism to the lower chassis is provided in the auto-changer unit 1, and a carriage 36 as conveying means for removably receiving the magazine 21 from the front magazine loading port 19 and conveying it horizontally along the guide rail 35 is movably supported on the guide rail 35. The carriage 36 is provided with a rack 40 on the lower portion thereof, and the drive force of the feed motor 37 is transmitted to this rack through a motor gear 38 and a gear 39, whereby the carriage is movable in the directions of arrows in FIG. 4 (the direction of thickness of the recording mediums, i.e., the cartridges).

The auto-changer unit 1 has, in the cartridge loading port 4 of the recording medium reproducing apparatus 2, changeover means for changing over the relative position of the recording medium reproducing apparatus 2 and the magazine 21 in the direction of thickness of the recording mediums so that a required cartridge may correspond to it. In this embodiment, the changeover means has on the carriage 36 a slit plate 41 formed with slits corresponding in number to the cartridges 20 (in this embodiment, five) contained in the magazine 21, at a predetermined pitch d, in order to move the cartridge 36 laterally from the magazine loading port 19 along the guide rail 35 at the pitch d.

This slit plate 41 is used for detection of the position of the carriage 36, and is moved in the gap 45a of a photointerrupter 45 fixed to the lower chassis 33 (the gap formed between the LED and a sensor opposed thereto) to detect by the photointerrupter 45 that when a slit has come to the center of the optical axis between the LED of the photointerrupter 45 and the sensor, the required disc cartridge in the magazine 21 has coincided with the position corresponding to the cartridge loading port 4.

The changeover means is controlled by control means (not shown) provided in the auto-changer unit 1 so that in order to make a cartridge 20 selected by cartridge selecting means (which will be described later) provided in the auto-changer unit 1 correspond to the cartridge loading port 4, the amount of changeover operation, i.e., in this embodiment, the amount of rotation of the feed motor 37 corresponding to a multiple of the pitch d, may be set by the selecting operation of the cartridge selecting means. Also, it is controlled by the control means so that during the interchange of the cartridges in each magazine, the magazine 21 may be moved to a position corresponding to the magazine loading port 19.

In this embodiment, the carriage 36 is formed with five triangular grooves 42 in the lower end surface thereof at intervals of the same pitch d. A convex portion 43a on top of a vertically flexible resilient member 43 provided on the motor bed 34 is removably fitted in these grooves 42. Thus, when the carriage 36 is moved, the resilient member 43 is depressed downwardly, but when the carriage is moved by a distance d, the resilient member is returned by its resilient force and the convex portion is fitted into the neighboring groove. The resilient member 43 used herein is made of soft synthetic resin so that the carriage 36 can move smoothly, but it receives the aid of a compression coil spring 44 in order to prevent itself from being permanently deformed by an overload or weakening with time.

With such construction, when the feed motor 37 is at a stop, the carriage 36 can be prevented from being moved by vibration, shock or other extraneous force and at the same time, the desired cartridge in the magazine 21 can secure a position exactly corresponding to the loading port 4.

In this embodiment, the cartridge selecting means is comprised of a series of switches, and has on the front panel of the auto-changer unit 1 an operating portion 15 in the form, for example, of a push button type switch for commanding the control of the changeover means for making the magazine 21 correspond to the magazine loading port 19, discretely from a power source switch 14, and a plurality of operating portions 16 corresponding to the number of the cartridges 20 contained in the magazine 21. When an operator selects and pushes one of them, a control signal corresponding thereto is outputted from the aforementioned control means and controls the amount and direction of rotation of the feed motor 37. At this time, the detection signal of the photointerrupter 45 working through the aforementioned slit plate 41 is fed back to the control means. As a result, the changeover means is operated so that the magazine 21 may correspond to the magazine loading port 19 in order to permit the interchange of the magazine 21, or the desired cartridge 20 in the magazine 21 is made to exactly correspond to the cartridge loading port 4 of the recording medium reproducing apparatus 2. Together with the operating portion 15 and the operating portions 16, display means such as a display LED 17 and display means such as a display LED 18 for displaying the selected state may preferably be provided on the front panel of the auto-changer unit 1.

Figure 6:
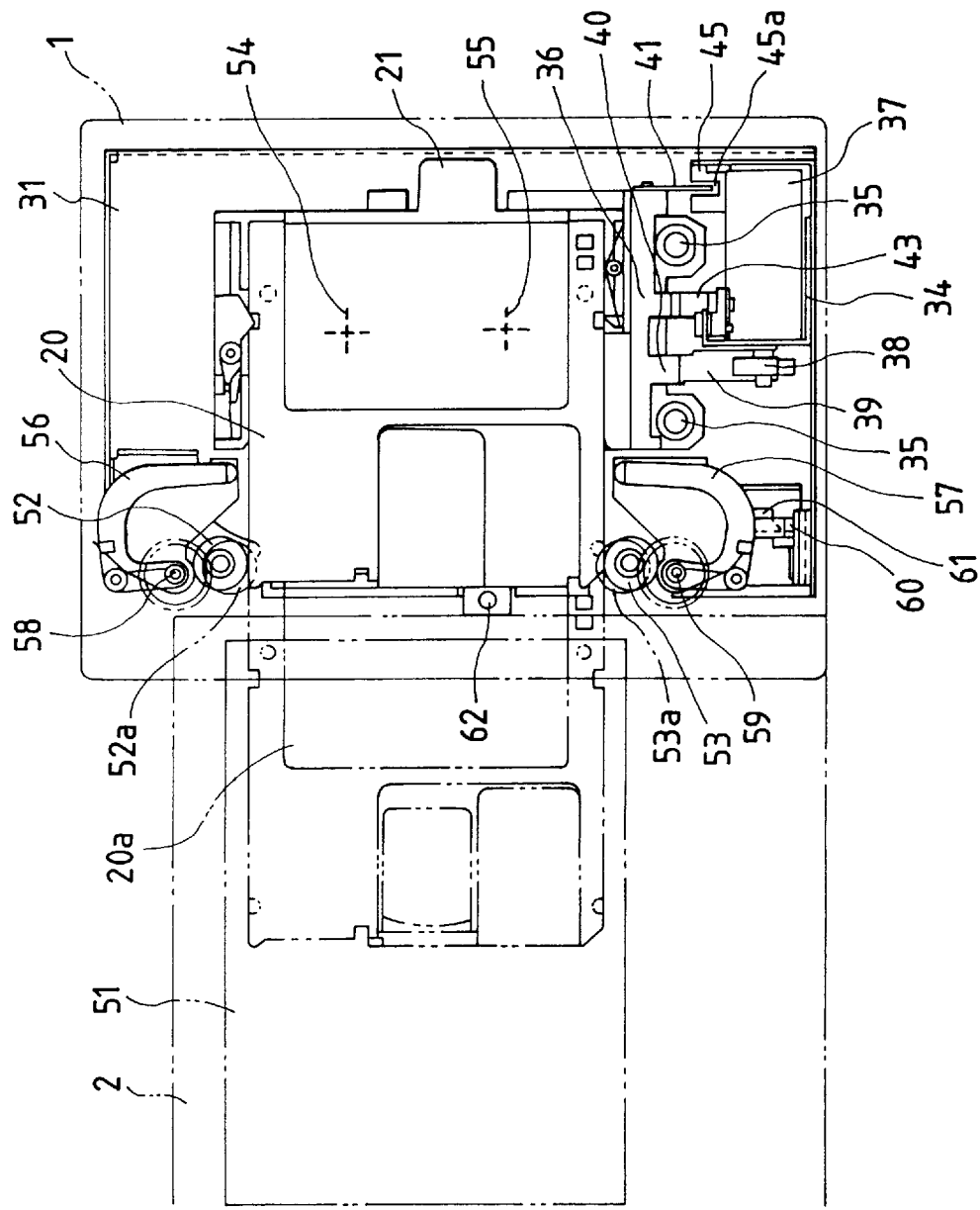
FIG. 6 is a side view showing the state before cartridge loading in the connected state.

In this embodiment, the aforementioned loading means is incorporated in the auto-changer unit 1 side, and is comprised of a pair of feed rollers 52 and 53 located on the upper and lower portions of the back corresponding to the cartridge loading port 4 of the recording medium reproducing apparatus 2 and mounted on the chassis, and a pair of U-shaped push levers 56 and 57 as cartridge pushing means (see FIG. 6). Each of the feed rollers is provided with anti-slippage rubber on the peripheral surface thereof.

Thus, the required cartridge 20 in the magazine 21 corresponding to the cartridge loading port 4 and supported by the carriage 36 is rolling-contacted by the feed rollers 52 and 53 in such a manner that it is sandwiched from the widthwisely opposite sides thereof, whereby it is subjected to the operation of being fed into and taken out of the cartridge loading port 4.

Particularly, in this embodiment, the push levers 56 and 57 are pivotally supported on a support bracket provided on the chassis, by pivot pins 58 and 59, and are pivotally moved about those pivot pins, whereby the rear end portion of the cartridge 20 fed in advance to from the magazine 21 to the cartridge loading port 4 by the feed rollers 52 and 53 can be pressed by the pushing end portions 56a and 57a of the push levers 56 and 57 and thus, the cartridge 20 can be fully pushed into the recording medium reproducing apparatus 2.

In this embodiment, each of the push levers 56 and 57 is not a unitary part, but is comprised of a plurality of parts.

With the push lever 56 taken as an example, the details thereof will hereinafter be described with reference to FIGS. 10 and 11. The push lever 56 is comprised of a tip end portion 63, a root portion 64, a pivot shaft 65 and a torsion spring 66. The tip end portion 63 is pivotally supported on the root portion 64 through the pivot shaft 65. The torsion spring 66 has its coil portion disposed about the pivot shaft 65, and one end thereof is hooked on a spring hooking portion 63a and the other end thereof is hooked on the root portion 64. Accordingly, the tip end portion 63 is biased clockwisely about the pivot shaft 65 relative to the root portion 64, but is held in the state of FIG. 10 because the convex portion 63b of the tip end portion 63 bears against the convex portion 64a of the root portion 64.

The pivotally moved state of the push levers 56 and 57 is detected by their plate-like shielding convex portions 61 coming into and out of the space between the light source and sensor of a photointerrupter 60 provided on the aforementioned support bracket. In this embodiment, design is made such that when the shielding convex portions 61 come into the space between the light source and the sensor, the terminal of the returning movement of the push levers 56 and 57 is detected and the detection signal is sent from the photointerrupter 60 to the aforementioned control means so that the driving of these push levers may be stopped.

Drive sources for the feed rollers 52, 53 and the push levers 56, 57 and the operations thereof are accomplished by mechanical structure shown in FIGS. 8 and 9. That is, in FIG. 8, there is shown a driving system for the former which is disposed outside the right chassis 31, and in FIG. 9, there is shown a driving system for the latter which is disposed on the left chassis 32 side.

The driving system for the former will first be described. A feed roller operating plate 71 and a feed roller operating plate 72 are supported on the right chassis 31 for pivotal movement about a rotational shaft 73 corresponding to a point 54 in FIGS. 6 and 7 and about a rotational shaft 74 corresponding to a point 55 in FIGS. 6 and 7, respectively. Roller shafts 75 and 76 are provided on the rear end portions of these plates 71 and 72, respectively, and roller gears 77 and 78 are supported for rotation about these shafts 75 and 76, respectively. The roller gears 77 and 78 each are of a long cylindrical shape in a direction perpendicular to the plane of the drawing sheet of FIG. 8, and the feed rollers 52 and 53 are pressed into the ends of the roller gears.

Gears 79–84 for transmission are mounted for rotation about pivot shafts studded in the plates 71 and 72. Gears 81 and 84 are in meshing engagement with each other, and a gear 85 meshing with the gear 84 is supported for rotation about a pivot shaft fixed to the right chassis 31, and a gear 86 meshing with the gear 85 rotates with the output shaft 87 of a drive motor disposed inside the right chassis 31.

Also, gears 88 and 89 having pitch circles of the same radius centering around the rotational shafts 73 and 74 and meshing with each other are fixed on the plates 71 and 72. When the fixed gears 88 and 89 mesh with each other, the roller gears 77 and 78 are adapted to be moved toward and away from each other in vertically symmetrical positions by the rotation of the fixed gears 88 and 89. If one of the plates 71 and 72 is pivotally moved by the fixed gears 88 and 89, the other plate will be pivotally moved by the same angle in the opposite direction.

Figure 7:
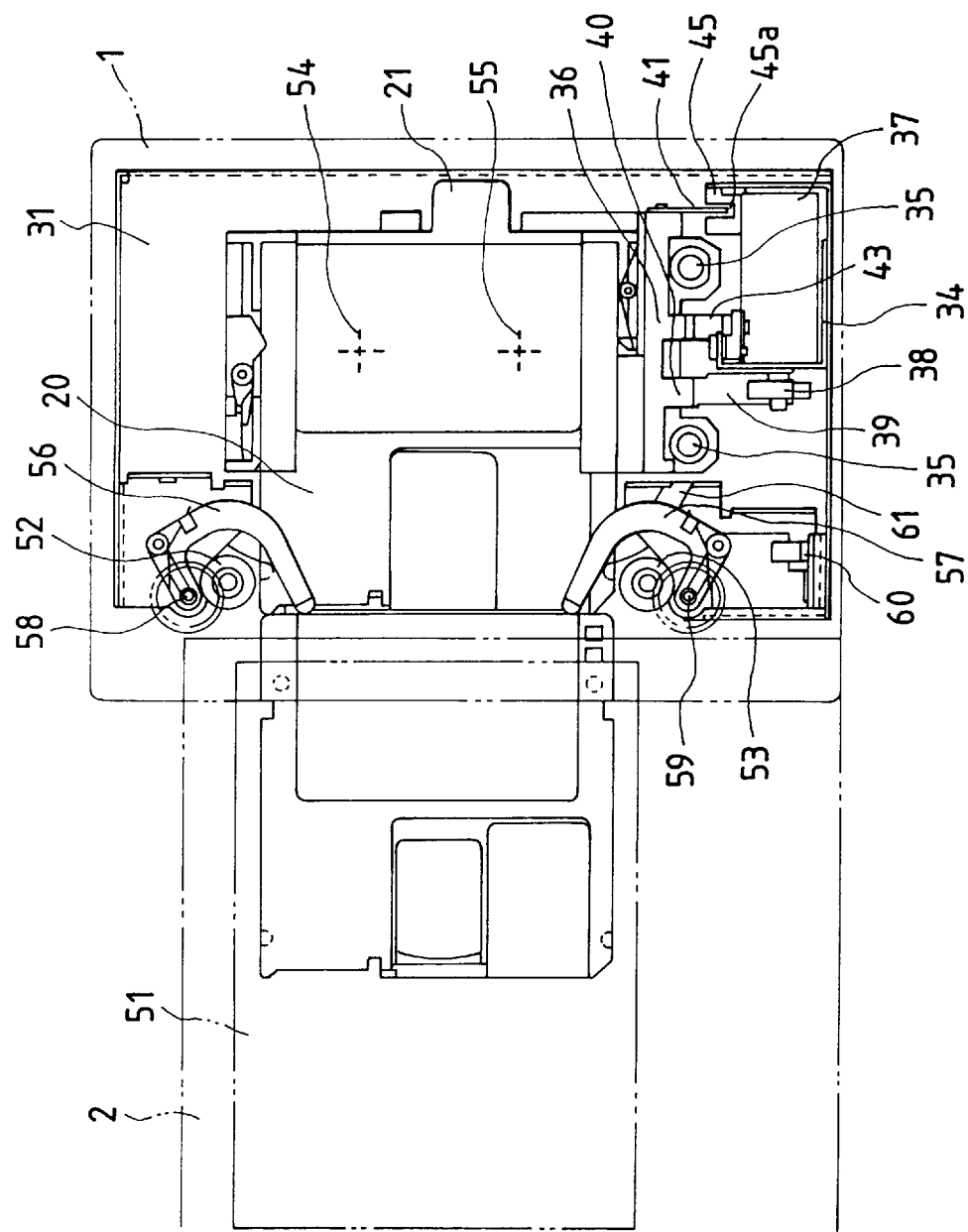
FIG. 7 is a side view showing the state immediately before the termination of cartridge loading.

Reference numeral 90 designates a tension spring which biases the plate 71 counter-clockwisely. Therefore, the feed rollers 52 and 53 are normally vertically spaced apart from each other as shown in FIG. 7, and are spaced apart from the widthwisely opposite sides of the cartridge 20 corresponding to the loading port 4. Accordingly, the feed rollers do not hinder the movement of the carriage 36 even when the carriage 36 is moved in the direction of thickness of the recording mediums.

Reference numeral 91 denotes a solenoid, of which the fixed portion is supported by the lower chassis 33 and the movable portion 92 is connected to the bent portion 72a of the roller plate 72. By this solenoid 91 being electrically energized, the plate 72 is rotated counter-clockwisely. Further, reference numeral 93 designates a photointerrupter, into the gap of which the convex portion 71a of the plate 71 may come for light interception.

The driving system for the latter will now be described. A gear 100 is mounted on the shaft 101 of a motor disposed inside the left chassis 32, and two-stage gears 102, 103 and gears 104–107 are supported for rotation about pivot shafts studded in the left chassis 32. Shaft fixing plates 108 and 109 provided outside the left chassis 32 have lever shafts 110 and 111 studded therein, and lever gears 112 and 113 are provided for rotation about these lever shafts. These lever gears are connected to the push levers 56 and 57 so as to rotate with the latter. Accordingly, the rotational force of the push lever driving motor is transmitted from the shaft 101 to the gear 100, the two-stage gear 103, the gear 107, the lever gear 113 and the gear 105, the gear 104, the two-stage gear 102, the gear 106, the lever gear 112 to thereby pivotally move the push levers 56 and 57.

Further, in a state in which the recording medium reproducing apparatus has been loaded with a cartridge by the loading means (this state includes, in addition to the information reproducing operation in the recording medium reproducing apparatus, the inserting and taking-out operations of the cartridge 20, in other words, the state until the cartridge 20 is returned into the magazine 21), it is preferable that the cartridge selecting means inhibit the conveying operation of the feed motor 37 to thereby limit the magazine 21 so that the magazine 21 may be held at the position corresponding to the loading port 4 and its separating movement may not take place.

So, in the present invention, the auto-changer unit quipped with the loading means is provided with means for limiting the movement of the magazine in order to secure the position of the magazine in the auto-changer unit until a required cartridge inserted in the recording medium reproducing apparatus is returned into the magazine. In this case, the movement limiting means may preferably be control means which detects the signal of the recording medium reproducing apparatus side and the operative state of the loading means to thereby limit the movement of the magazine.

As a specific construction of this means, in this embodiment, a phototransistor 60 is provided on the rear end portion of the right chassis 31 and is used in pair with an LED (not shown) provided on the rear end portion of the left chassis 32. This LED continuously emits light and usually, this light is received by a phototransistor 62, but in the process of inserting or taking out the cartridge 20 with respect to the recording medium reproducing apparatus 2, the light is intercepted by the cartridge 20 and therefore, this state can be detected. Thus, this detection signal is given to the aforedescribed control means to thereby limit the operation of the changeover means in this state. In this case, provision may preferably be made of display means for displaying the state in which the recording medium reproducing apparatus has been loaded with the cartridge by the loading means.

The operative state of the auto-changer will now be described with respect to each function. First, in case of the interchange of the magazine, the operating portion 15 is pushed and in a state in which the magazine 21 has made the selected cartridge 20 correspond to the loading port 4 by the change-over means, the magazine 21 with the cartridges 20 therein can be bodily taken out of the auto-changer unit 1 and a magazine 21 containing new cartridges therein can be inserted. Also, when one of cartridges 20 is drawn out of the magazine in the auto-changer unit 1 and is inserted into the recording medium reproducing apparatus 2, this state is grasped by the control means, and there takes place the operation of returning that cartridge 20 into the magazine, and then operating the changeover means to thereby return the magazine to the position corresponding to the magazine loading port 19.

Also, when one of the operating portions 16 is selected and a required cartridge 20 is selected, the carriage 36 is moved by the operation of the changeover means and an operation is performed so that the selected cartridge 20 in the magazine 21 may correspond to the cartridge loading port 4. Then, for example, that operating portion 16 is pushed once more, whereby the cartridge can be returned from the recording medium reproducing apparatus 2 side into the magazine. Or when an operating portion discrete from that operating portion corresponding to the cartridge inserted in the recording medium reproducing apparatus 2 is selected, the changeover means is -operated so that the already inserted cartridge may be returned into the magazine, whereafter a cartridge corresponding to an operating portion for post-operation may correspond to the loading port 4.

In this case, it is preferable to set the display LED 17 so as to be turned on when for example, the magazine 21 is at a position whereat it can be removed from the magazine loading port 19 and to be turned on and off during the movement of the magazine. Likewise, in a state in which a cartridge is inserted in the recording medium reproducing apparatus 2, it is preferable to set the display LED 18 corresponding to that cartridge so as to be turned on, and to be turned on and off in the process of insertion or taking-out. Of course, it is also possible to directly perform the above-described operation by a control signal from a personal computer, a work station or the like to which the recording medium reproducing apparatus 2 is connected.

When a desired cartridge 20 is brought to the position corresponding to the loading port 4 by the changeover means, this cartridge is first conveyed by the feed rollers 52 and 53. The feed rollers 52 and 53 are normally in the positions shown in FIG. 7 and are spaced apart from the widthwise sides of the cartridge 20. Accordingly, they do not hinder the movement of the carriage 36. However, when a cartridge loading command to the recording medium reproducing apparatus 2 is outputted from the control means, the loading of a cartridge is done in accordance with a flow chart shown in FIG. 12. That is, the solenoid 91 is first electrically energized. At this time, a force greater than the biasing force of the tension spring 90 is created in the solenoid 91 and, therefore, the feed rollers 52 and 53 are rotated about the points 54 and 55, respectively, and come into rolling contact with the sides of the cartridge 20. In this case, the gear 86 begins to be rotated counter-clockwisely by the driving of the feed roller rotating motor and transmits the drive force to the gear 85, the gear 84, the gear 83, the gear 82 and the roller gear 78 in the named order. At the same time, it transmits the drive force to the gear 85, the gear 84, the gear 81, the gear 80, the gear 79 and the roller gear 77 in the named order. Thus, the feed rollers 52 and 53 are rotated clockwisely and counter-clockwisely, respectively, to thereby begin to convey the cartridge 20 to the recording medium reproducing apparatus 2 side.

In the meantime, the feed rollers 52 and 53 are pulled toward the cartridge by the solenoid 91 and therefore, when as shown in FIG. 6, the cartridge 20 is conveyed until its rear end comes to the feed rollers, the feed rollers 52 and 53 are moved toward each other and begin to rotate idly at positions indicated by 52a and 53a in FIG. 6. At this time, the convex portion 71a of the plate 71 shields the space between the light source and sensor of the photointerrupter for the first time, and by the detection of this, the control means discriminates the empty state of the cartridge in the corresponding slot core of the magazine side and makes the operation limiting means function. Also, the control means outputs a command and starts to drive the push levers 56 and 57 and at the same time, stops the driving of the feed roller rotating motor. If at this point of time, the solenoid 91 is electrically deenergized, the once conveyed cartridge may be pushed back and therefore, the solenoid is electrically deenergized with a delay of e.g. 200–500 m/s.

When the conveyance of the cartridge 20 to the recording medium reproducing apparatus 2 side by the feed rollers 52 and 53 is terminated, the pushing of the cartridge 20 by the push levers 56 and 57 is started. The push lever 56 pivotally moves clockwisely from the position of FIG. 6 and the push lever 57 pivotally moves counter-clockwisely from the position of FIG. 6, and from a point of time at which their tip end portions 56a and 57a bear against the rear end of the cartridge 20, the pushing of the cartridge 20 is started. When the push levers 56 and 57 further pivotally move via the position of FIG. 7 and the cartridge 20 is fully pushed into the loading port 4, the cartridge 20 is locked by the drive 51 in the recording medium reproducing apparatus 2 and is held in a reproducing operation position.

Figure 10:
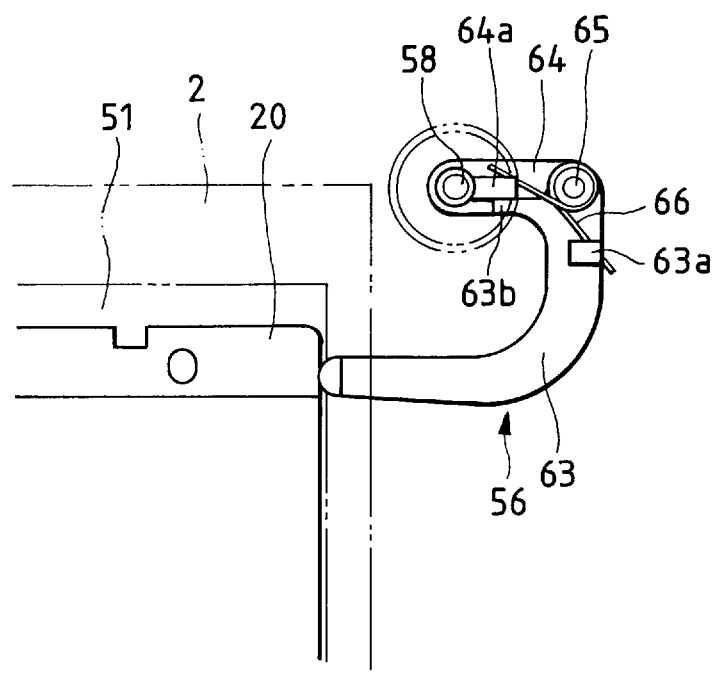
FIG. 10 is a side view showing the details of the push lever.

On the other hand, a media detecting switch (not shown) for detecting that the cartridge 20 has been held in the reproducing operation position is provided on the drive 51 and detects the termination of the loading of the cartridge, and on the basis of the detection signal from this Media detecting switch, the control means acts to stop the pivotal movement of the push levers 56 and 57, but there is unavoidably more or less time lag until the drive motor for the push levers is stopped from the state of FIG. 10.

Figure 11:
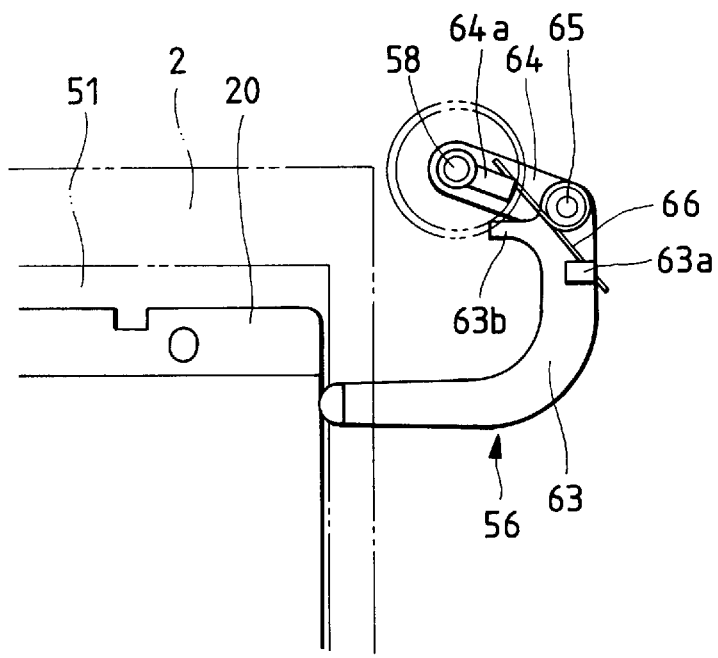
FIG. 11 is a side view showing the operative state of the push lever.

Accordingly, if the push lever 56 is comprised of a single part, it may become unable to be moved in the state of FIG. 10 in spite of the motor trying to rotate further, and all the drive force may be applied to the push lever and in the worst case, some portion of the drive force transmitting mechanism from the motor to the push levers may be damaged, but in the present embodiment, as previously described, the push lever 56 is comprised of a plurality of parts and therefore, the root portion 64 can further pivotally move against the biasing force of the torsion spring 66 as shown in FIG. 11, and accordingly, the rotation of the motor by a time lag can be absorbed.

Immediately after that, the motor operates reversely and begins to return the push levers 56 and 57 to their original positions. When the sheet-like convex portion 61 of the push lever 57 then shields the space between the light source and sensor of the photointerrupter 60, the solenoid 91 is electrically deenergized and the driving of the push levers 56 and 57 is stopped, and the push levers 56 and 57 can again return to their positions outside the cartridge moving area of FIG. 6.

Description will now be made of the operation when the cartridge 20 loaded on the drive 51 of the recording medium reproducing apparatus 2 is to be returned into the magazine 21. On the basis of a control signal in the recording medium reproducing apparatus 2 or via the auto-changer unit 1, the cartridge 20 loaded on the drive 51 is ejected in accordance with a flow chart shown in FIG. 12. That is, after an eject command for the cartridge 20 has thus come, the rear portion of the cartridge 20 is pushed out from the loading port 4 to the auto-changer unit 1 side by a means on the recording medium reproducing apparatus 2 side. When the light of the LED so far received by the phototransistor 62 is intercepted by the cartridge 20, the feed rollers 52 and 53 rotate about the points 54 and 55, respectively, by a command from the control means and bear against the widthwisely opposite sides of the cartridge 20.

At the same time, the feed rollers 52 and 53 rotate counter-clockwisely and clockwisely, respectively, and start the conveyance of the cartridge 20 so as to return the cartridge 20 to its original area in the magazine 21. The termination of the conveyance of the cartridge 20 into the magazine 21 is detected by the light interception by the cartridge being ended and the light of the LED arriving at the phototransistor 62. As a result, by a command from the control means, the biasing of the feed rollers 52 and 53 toward the cartridge is released and also, the rotation of the feed rollers 52 and 53 is stopped.

As described above, the cartridge is conveyed to the position 20a of FIG. 6 by the feed rollers 52 and 53 and therefore, thereafter the cartridge can be pushed in by a slight distance and thus, the pushing distance may be small. Accordingly, even relatively small push levers can sufficiently perform the pushing function and even if such levers are provided on the auto-changer unit side, there is no possibility of the entire apparatus becoming bulky.

[Second Embodiment]

In the above-described embodiment, the push levers are provided above the below the cartridge, but if there is no problem in the pushing operation, design may of course be made such that the feeding function is performed by only one of them. If for example, the mechanism concerned in the upper push lever 56 is eliminated, the dimension of the auto-changer unit in the direction of height thereof can be shortened, whereby the downsizing of the apparatus can be achieved.

Also, in the previous embodiment, the recording medium reproducing apparatus is not contained in the auto-changer unit itself, but is externally connected to the auto-changer unit, whereas of course, it may be contained in the auto-changer unit.

While description has been made herein with disc cartridges taken as an example, the auto-changer of the present invention is not directed to only disc-like recording mediums, but is of course applicable also to cartridges for other recording mediums such as tape-like or card-like recording mediums. Also, in the previous embodiment, design is made such that in case of the selection of a cartridge, the magazine 21 is horizontal moved by the changeover means and the selected cartridge 20 is made to correspond to the loading port of the recording medium reproducing apparatus 2, but alternatively, design may be made such that the magazine 21 is fixedly located in the auto-changer unit 1 corresponding to the magazine loading port 19 and the recording medium reproducing apparatus 2 is horizontally moved by the changeover means so as to make a desired cartridge 20 correspond to the loading port 4.

In this case, the cartridge conveying mechanism is provided on the recording medium reproducing apparatus side.

Also, the previous embodiment has been described by the use of a recording medium reproducing apparatus, but in the present invention, use may also be made of a recording medium recording-reproducing apparatus which can effect the recording and/or reproduction of information.

[Third Embodiment]

In the aforedescribed embodiments, the drive source for the feed rollers 52 and 53 and the drive source for the push levers 56 and 57 have been prepared discretely from each other, but in this embodiment, a common drive source is used. That is, when as shown in FIGS. 14 to 17, the plates 71 and 72 are pulled back by the tension spring 90 with the electrical energization of the solenoid 38 released, respective lever gears 59a mesh with the roller gears 77 and 78, whereby the drive force of the drive source for the feed rollers 52 and 53 is transmitted to the push levers 56 and 57. Thus, the push levers 56 and 57 are driven by the drive force of the drive source for the feed rollers 52 and 53.

In the present embodiment, it is preferable that the conveyance by the feed rollers be started in a short time (e.g. 0.1–0.5 sec.) after the electrical energization of the solenoid 91 has been stopped, and this also holds true of the start of the conveyance by the push levers. Thus, the rotative driving of the feed rollers is done after the meshing engagement between the roller gears 77, 78 and the respective lever gears 59a is completely released, and the push levers are driven after the rollers gears 77, 78 and the respective lever gears 59a have reliably come into meshing engagement with each other. By a time difference being thus provided, the reliability of the operation can be achieved and also the damage or like accident of the gears can be avoided.

[Fourth Embodiment]

This embodiment is an improvement over the construction of the above-described third embodiment.

Specifically, as shown in FIGS. 18 to 21, provision is made of a brake member 94 (comprising an angle convex portion 94A and a leaf spring 95 biasing it toward the cartridge side) for blocking the return of the cartridge. Thereby, even when the feeding by the feed rollers 52 and 53 is terminated and these rollers are retracted to the opposite sides, the convex portion 94A of the brake member 94 fits into a recess formed in a side of the cartridge 20 to thereby block the return of the cartridge 20 caused by the cartridge discharging resilient biasing force of the recording medium reproducing apparatus side and therefore, when the push levers 56 and 57 operate thereafter, the hindrance of the operation by the cartridge is not brought about and high reliability as the conveying mechanism can be secured.

What is claimed is:

1. A cartridge auto-changer containing a plurality of cartridges therein to take out any one of said cartridges to thereby effect the recording and/or reproduction of information, said cartridge auto-changer including:

an information recording-reproducing apparatus for effecting recording and/or reproduction of information-on recording mediums contained in said cartridges;

a containing shelf for containing said plurality of cartridges therein; and conveying means for conveying one of said cartridges between said information recording-reproducing apparatus and said containing shelf, said conveying means including:

a feed roller conveying the one of said cartridges from said containing shelf to said information recording-reproducing apparatus, said feed roller contacting the one of said cartridges; and a push lever having a first end and a second end, said feed roller engages said first end of said push lever to move said second end of said push lever towards the one of said cartridges such that said second end of said push lever contacts and pushes the one of said cartridges completely into said information recording-reproducing apparatus subsequent to the conveyance of the one of said cartridges by said feed roller.

2. A cartridge auto-changer according to claim 1, wherein said conveying means is further provided with drive sources for said feed roller and said push lever.

3. A cartridge auto-changer according to claim 2, wherein the drive source for said feed roller and the drive source for said push lever are common to each other.

4. A cartridge auto-changer according to claim 1, wherein said conveying means is further provided with a brake member for preventing the return of the one of said cartridges conveyed to said information recording-reproducing apparatus.

* * * * *

UNITED STATES PATENT AND TRADEMARK OFFICE
CERTIFICATE OF CORRECTION

PATENT NO. : 5,850,376

DATED : December 15, 1998

INVENTOR(S) : Shihoh

Figure 12:
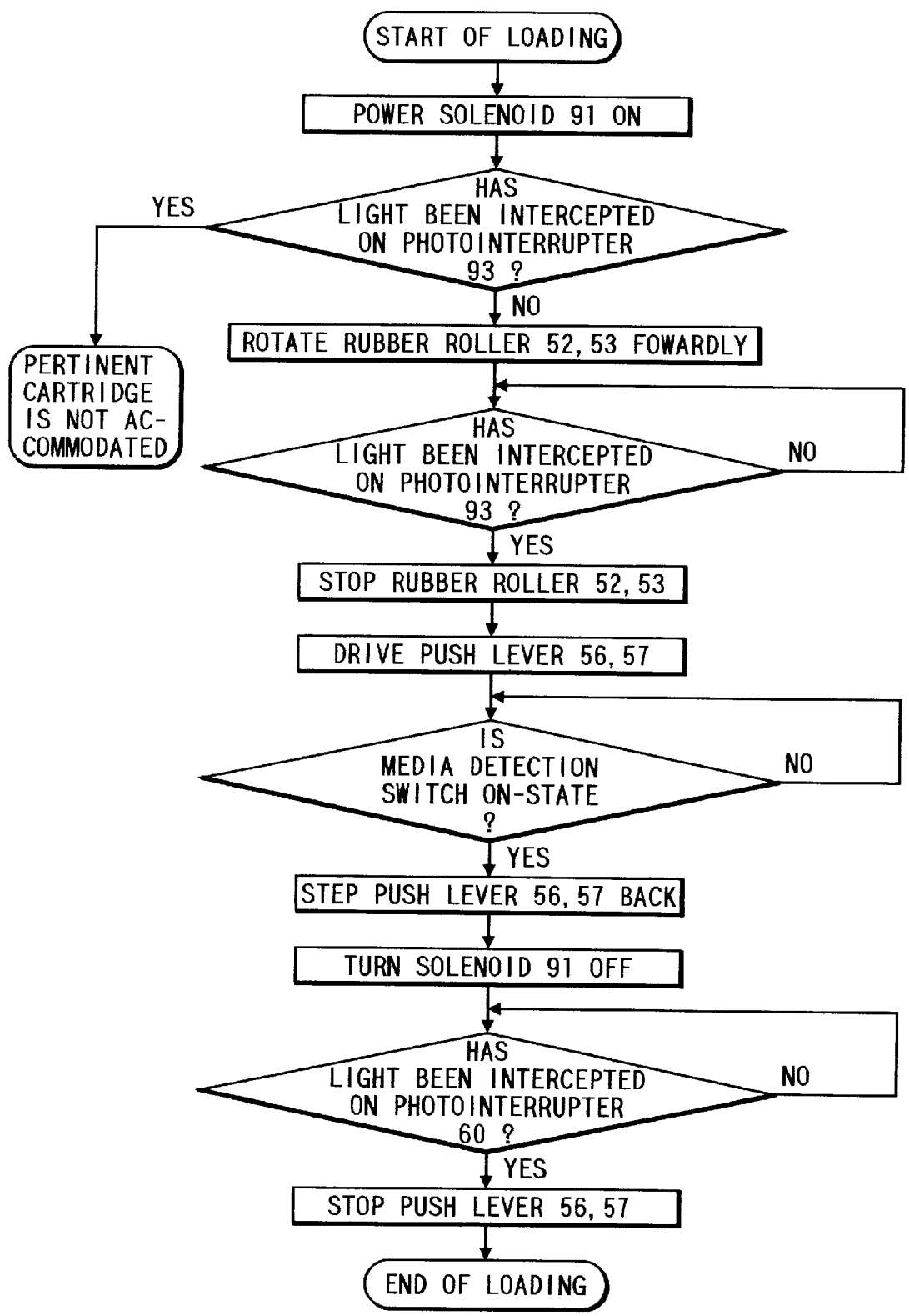
FIG. 12 is a flow chart showing the loading of a cartridge.
Figure 13:
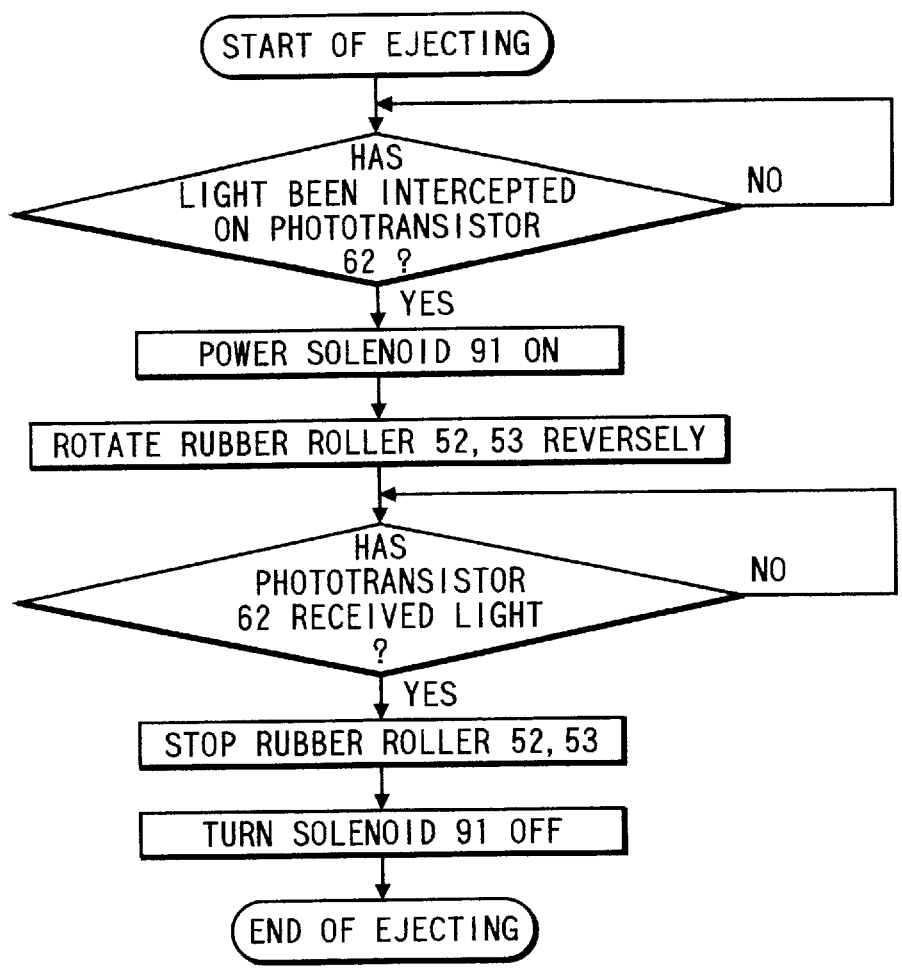
FIG. 13 is a flow chart showing the ejection of the cartridge.
Figure 14:
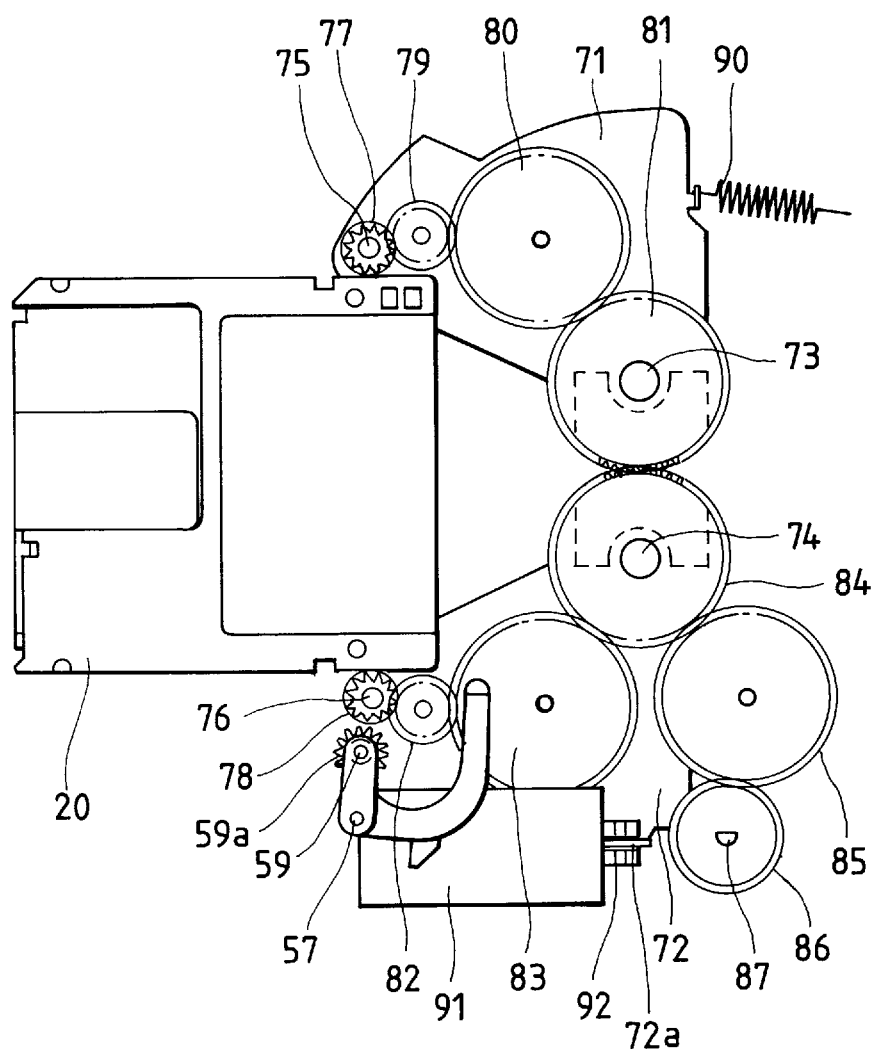
FIG. 14 is a side view showing a driving system for push levers in a third embodiment of the present invention.
Figure 15:
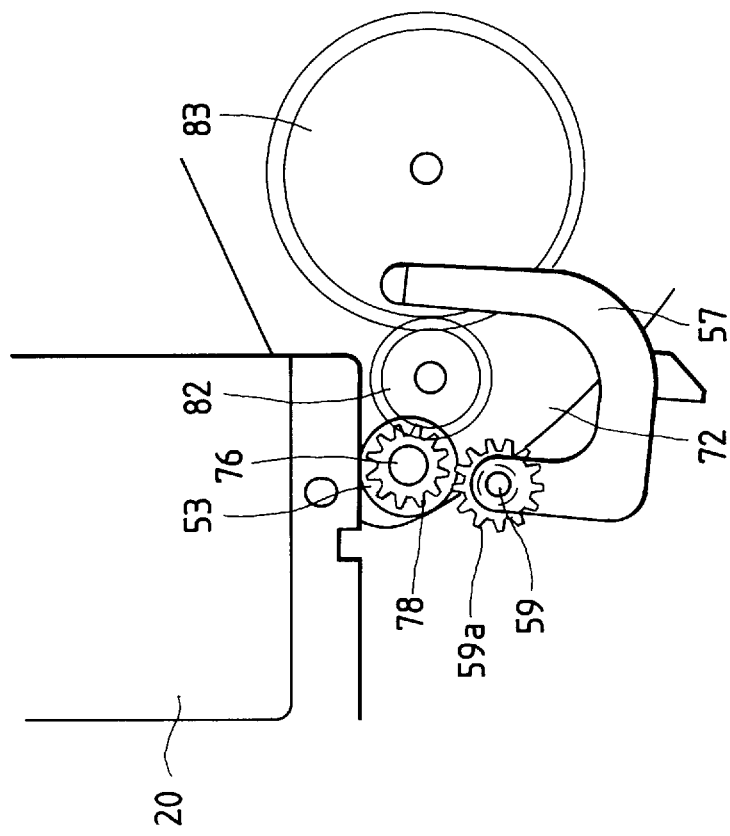
FIG. 15 is a side view showing the details of FIG. 14.
Figure 16:
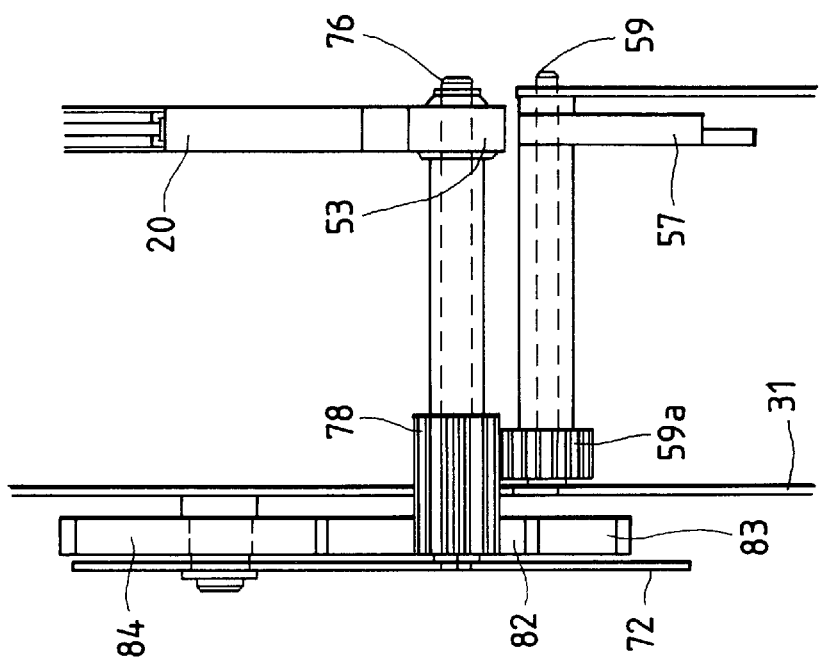
FIG. 16 is a front view of the construction shown in FIG. 15.
Figure 17:
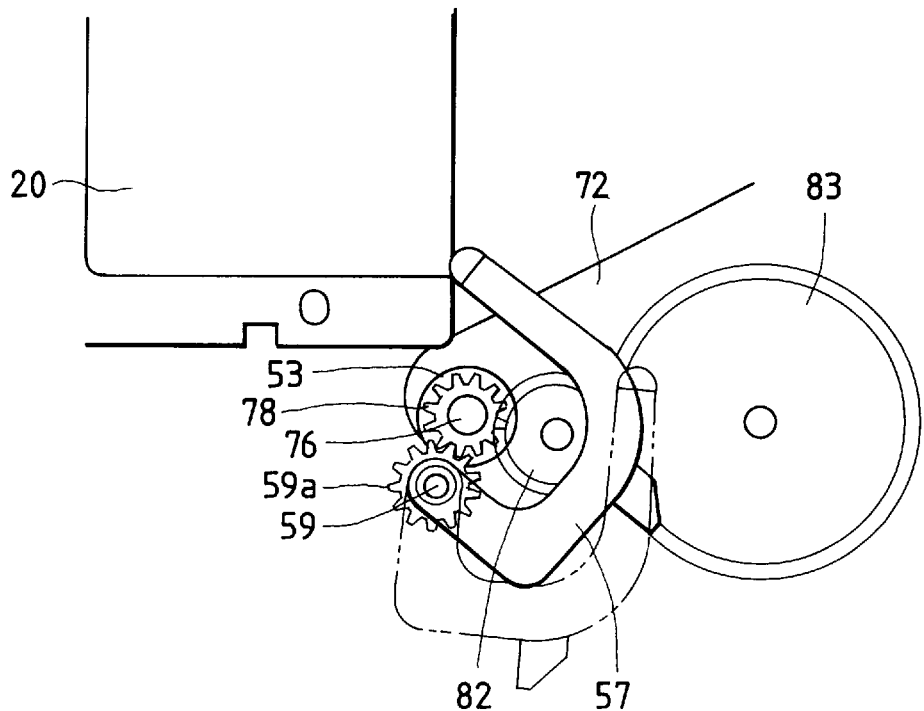
FIG. 17 is a side view showing the operative state of the construction shown in FIG. 15.
Figure 18:
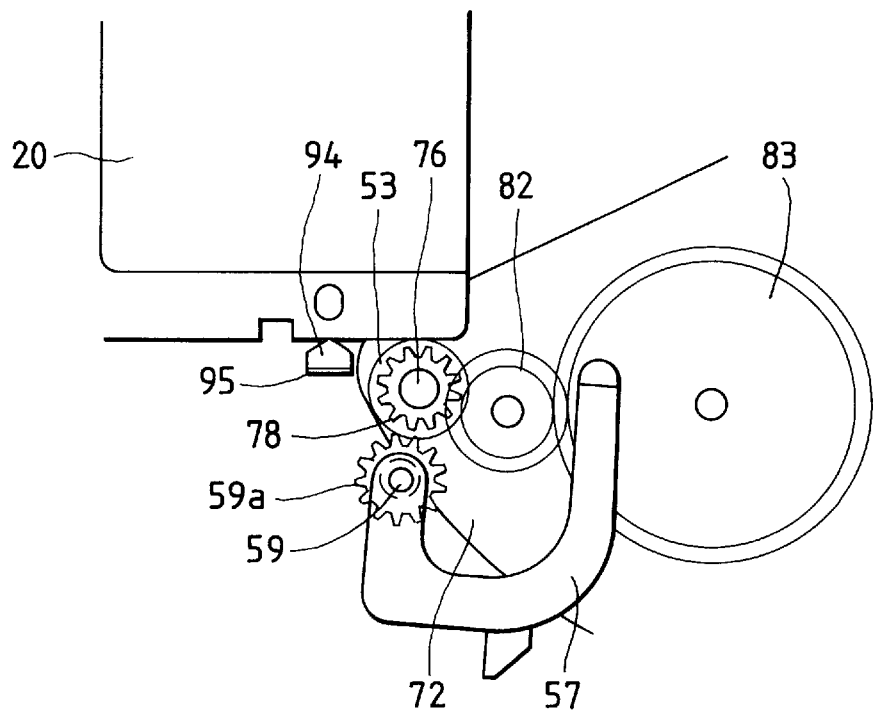
FIG. 18 is a side view showing a fourth embodiment of the present invention.
Figure 21:
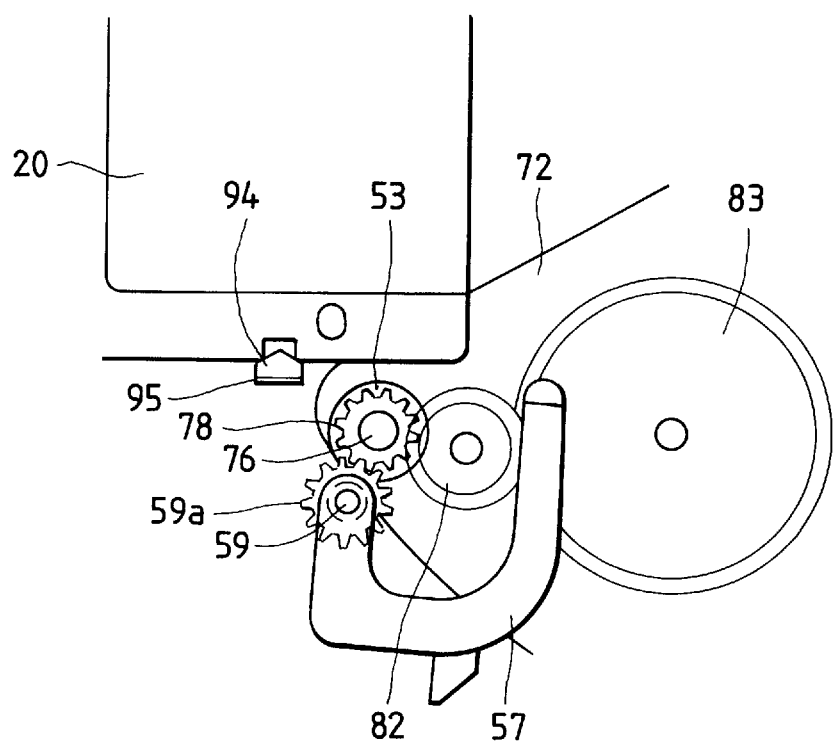
FIG. 21 is a side view showing the state of the termination of the operation by the feed rollers.

It is certified that error appears in the above-identified patent and that said Letters Patent is hereby corrected as shown below:

SHEET 8:

FIG. 12, "FOWARDLY" should read --FORWARDLY--.

COLUMN 1:

Line 56, "corresponding" should read --corresponding to--.

COLUMN 8:

Line 25, "-operated" should read --operated--.

COLUMN 10:

Line 33, "above the below" should read --above and below--.

Signed and Sealed this

Second Day of November, 1999

Attest:

Q. TODD DICKINSON

*Attesting Officer*         *Acting Commissioner of Patents and Trademarks*